United States Patent [19]

Bassett

[11] Patent Number: 4,726,405
[45] Date of Patent: Feb. 23, 1988

[54] EXTENSION TABLE ASSEMBLY FOR TABLE SAWS

[76] Inventor: Alvin L. Bassett, 6014 SE. 85th St., Portland, Oreg. 97266

[21] Appl. No.: 917,808

[22] Filed: Oct. 10, 1986

[51] Int. Cl.$^4$ ............................................. B27H 1/00
[52] U.S. Cl. ................................. 144/287; 83/467 A; 83/701; 108/59; 144/286 R; 269/296; 269/303
[58] Field of Search ............................ 144/286 R, 287; 83/467 A, 701; 108/12, 59, 111; 269/296, 297, 298, 301, 303, 318

[56] References Cited

U.S. PATENT DOCUMENTS 3,734,151 5/1973 Skripsky .......................... 144/286 R
4,068,551 1/1978 Kreitz .............................. 144/286 R

*Primary Examiner*—W. Donald Bray
*Attorney, Agent, or Firm*—John A. Hamilton

[57] ABSTRACT

An extension table assembly for a table saw, the extension assembly including an elongated top slab assembly supported by a wheeled carriage and attachable at one end to the top table of a table saw to be coplanar therewith, a series of fences carried by the top slab assembly at successively different spacings from that end of the top slab, each being movable from an operative position extending above the slab to an inoperative position not extending thereabove, and a loader assembly formed by a part of the top slab assembly and being pivotal to a vertical position for receiving a vertically disposed large or heavy work piece so that it may be easily moved onto the slab assembly by tilting the loader assembly back to horizontal. The wheeled carriage is collapsibly foldable upwardly against the bottom of the top slab assembly, this collapsing action being accomplished semi-automatically by pushing the assembly forwardly over the rearward edge of a truck bed.

13 Claims, 19 Drawing Figures

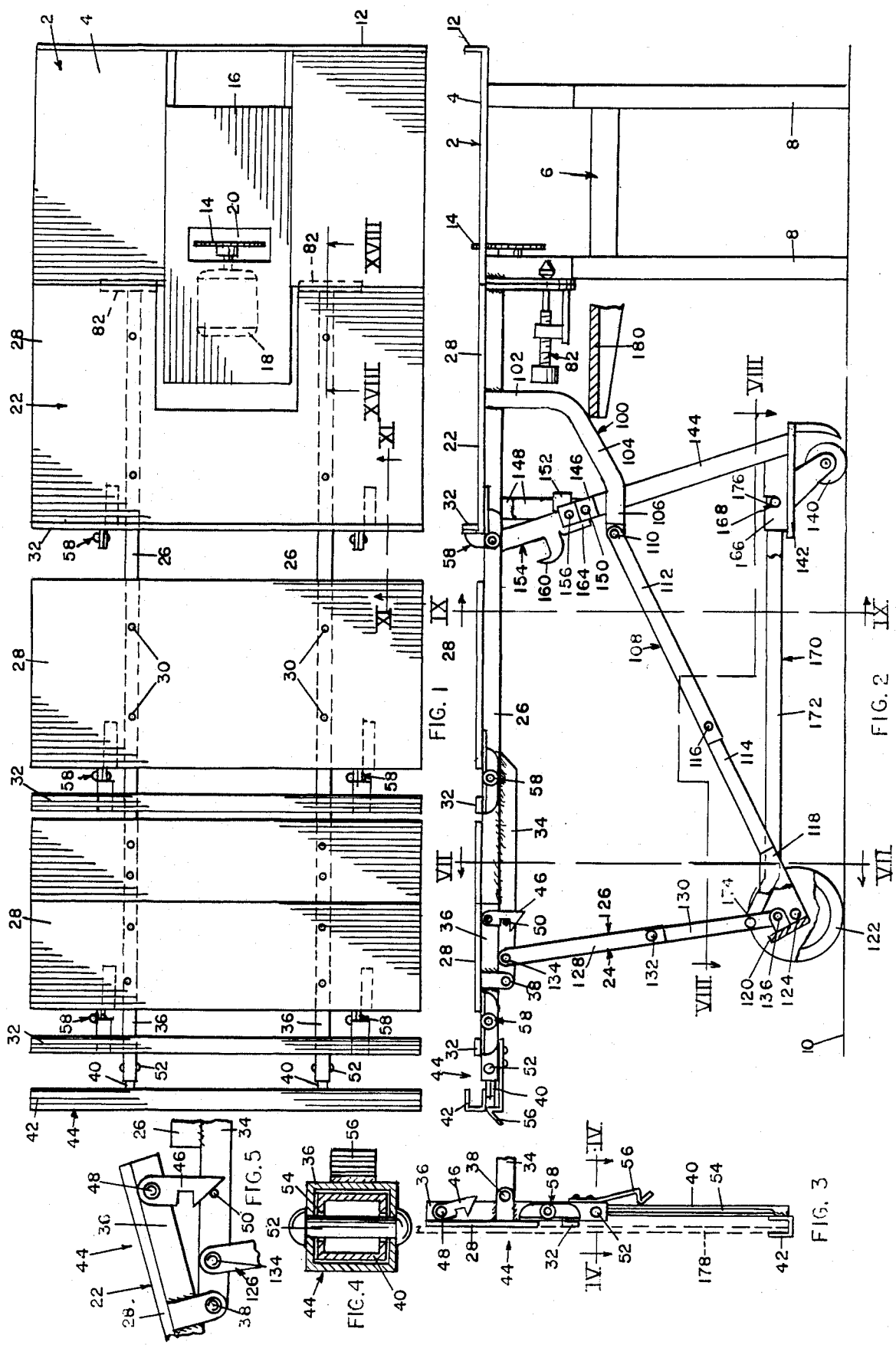

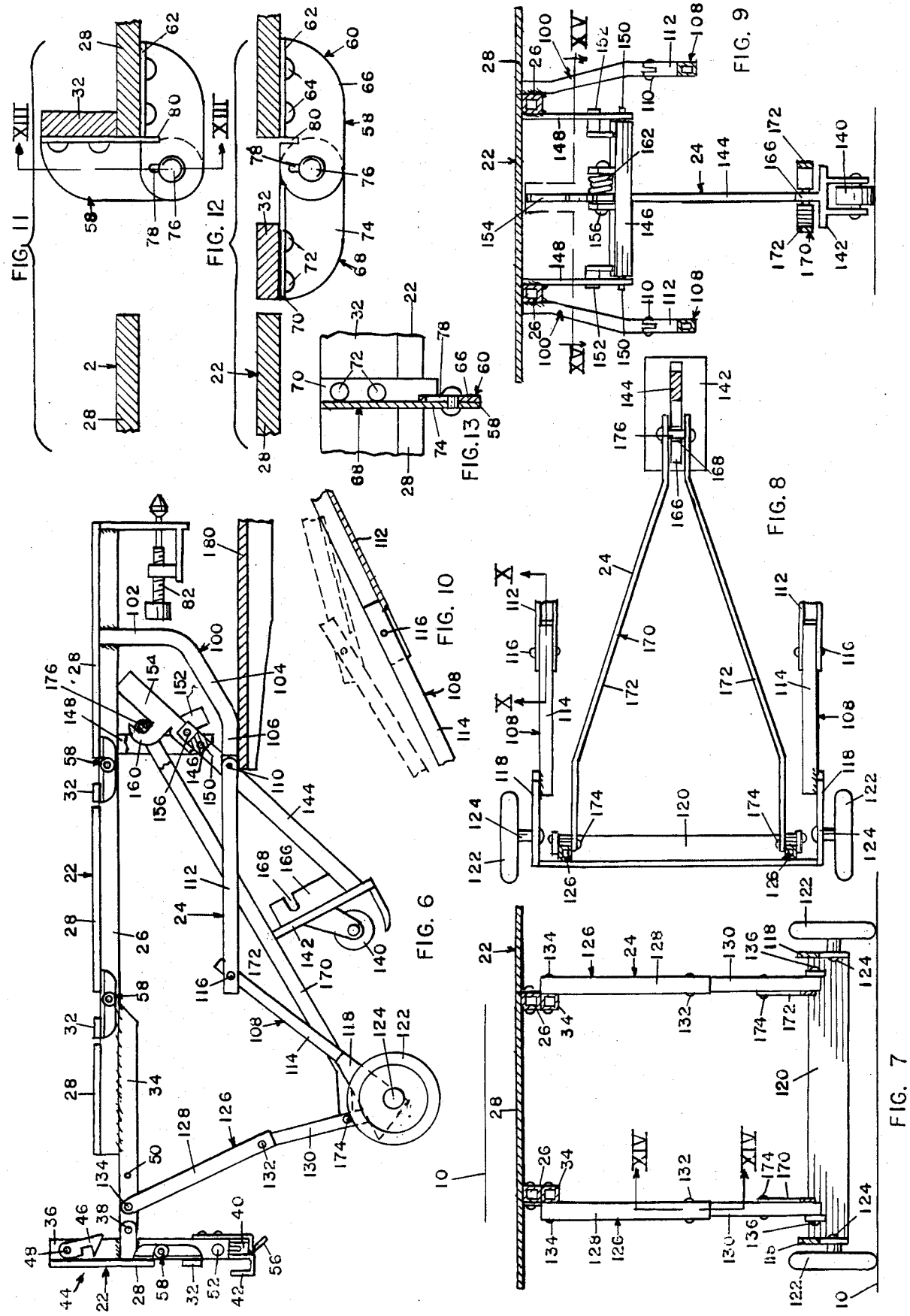

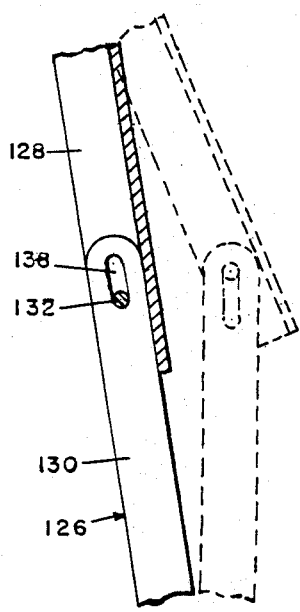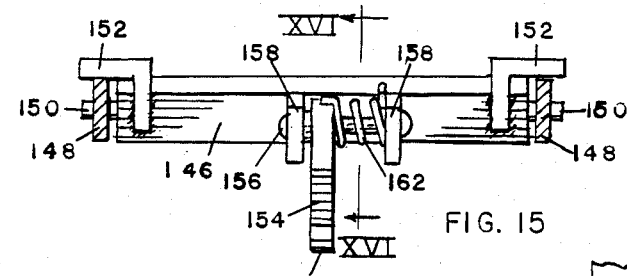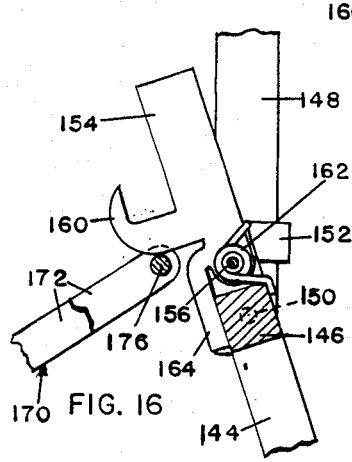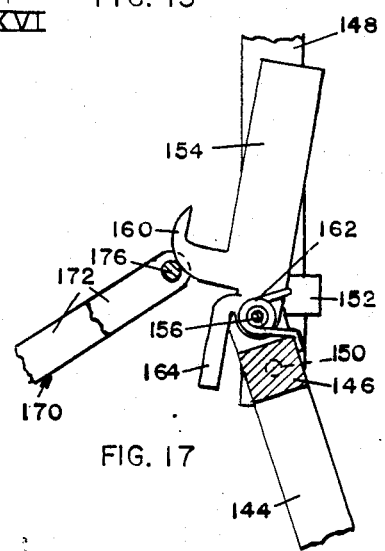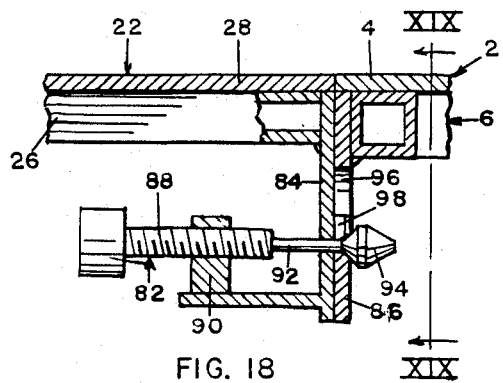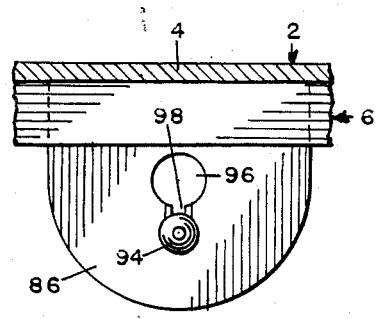

EXTENSION TABLE ASSEMBLY FOR TABLE SAWS

This invention relates to new and useful improvements in table saws, and relates particularly to table extension devices for table saws. The present invention is best suited to table saws in which the saw blade is adjustable laterally of its own plane over the table surface, relative to a normally fixed work-guiding fence, rather than a table saw in which the blade is spatially fixed relative to the table and having a fence parallel to the blade plane and laterally adjustable relative to the blade.

The primary object of the present invention is the provision of an extension table assembly attachable to the table saw itself to form a coplanar extension of the table thereof, whereby to enable the table saw to be used in conjunction with much larger work pieces, such for example as four-by-eight foot sheets of plywood pannelling or the like, than would be possible with the usual basic table saw itself. To this end the extension table assembly consists of an elongated table attachable at one end to an edge of the table portion of the basic table saw parallel to the plane of the table saw blade, and having a fence rising therefrom parallel to the blade plane to guide work pieces relative to the blade. If the blade is adjustable transversely of its own plane relative to the basic saw table, the fence of the extension assembly may be fixed relative to the extension assembly.

Another object is the provision of an extension table assembly of the character described having a plurality of said fences spaced at successively greater distances from the blade, each fence being selectively adjustable between an upstanding position in which it performs its function as a fence, and a lowered position in which it is flush with and serves as a portion of the work supporting surface of the extension table, in order to enable the extension better to handle work pieces of incrementally greater lengths.

A further object is the provision of an extension table assembly of the character described having means greatly facilitating and reducing the physical exertion of loading larger work pieces, which are corresponding heavier, onto the extension table. To this end, the extension table is provided with a loading section pivotable to a vertical attitude and extendable downwardly nearly to ground level, so that a heavy work piece in a vertical position may be easily placed thereon, whereupon the work piece will be deposited on the extension table in a horizontal attitude when the loader section is again pivoted to horizontal.

A still further object is the provision of an extension table assembly of the character which is provided with a wheeled supporting carriage independent of the basic table saw itself, whereby the extension table assembly may serve as a cart for transporting lumber and other supplies, and even the table saw itself, which ordinarily is not equipped with wheels.

A further object is the provision of an extension table assembly of the character described in which the wheeled supporting carriage of the assembly is collapsible upwardly against the top slab of the extension table itself, whereby the entire assembly may itself be conveniently transported, for example, in the bed of a pick-up truck. Further, for convenience, the collapsing function is accomplished simply by moving the assembly forwardly by manual force against the rearward edge of the truck bed.

Other objects are simplicity and economy of construction, ease and convenience of use, and efficiency and durability of operation.

With these objects in view, as well as other objects which will appear in the course of the specification, reference will be had to the accompanying drawing, wherein:

FIG. 1 is a top plan view of an extension table for table saws embodying the present invention, shown operatively attached to a transversely adjustable table saw, FIG. 2 is a side elevational view of the structure as shown in FIG. 1, FIG. 3 is a view similar to FIG. 2 of the rearward end portion of the extension table assembly, showing the loader section thereof pivoted to a vertical position and extended downwardly, with a work piece placed therein being shown in dotted lines, FIG. 4 is an enlarged sectional view taken on line IV—IV of FIG. 3, FIG. 5 is an enlarged fragmentary view of the rearward portion of the extension assembly shown in FIG. 3, illustrating operation of the latch for securing the loader section in horizontal position, FIG. 6 is a view similar to FIG. 2, but showing the wheeled supporting carriage of the assembly in a partially upwardly collapsed position, FIG. 7 is a sectional view taken on line VII—VII of FIG. 2, FIG. 8 is a sectional view taken on line VIII—VIII of FIG. 2, FIG. 9 is a sectional view taken on line IX—IX of FIG. 2, FIG. 10 is an enlarged sectional view taken on line X—X of FIG. 8, illustrating the folding action of one pair of the struts of the wheeled carriage, FIG. 11 is an enlarged, fragmentary sectional view taken on line XI—XI of FIG. 1, showing one of the fence hinges, FIG. 12 is a view similar to FIG. 11, but showing the hinged fence lowered to serve merely as a part of the table slab, FIG. 13 is a fragmentary sectional view taken on line XIII—XIII of FIG. 11, FIG. 14 is an enlarged, fragmentary sectional view taken on line XIV—XIV of FIG. 7, illustrating the buckling action of one of the rear carriage legs, FIG. 15 is an enlarged fragmentary sectional view taken on line XV—XV of FIG. 9, FIGS. 16 and 17 are fragmentary sectional views taken on line XVI—XVI of FIG. 15, showing successive stages in the operation of another strut of the carriage of the assembly, FIG. 18 is an enlarged, fragmentary sectional view taken on line XVIII—XVIII of FIG. 1, showing a connector for connecting the extension assembly to the basic table saw, and FIG. 19 is a sectional view taken on line XIX—XIX of FIG. 18.

Like reference numerals apply to similar parts throughout the several views, and the numeral 2 applies generally to a simplified showing of a more or less standard basic table saw, which consists of a horizontal table top slab 4, supported by a frame 6 having legs 8 supporting the table from floor 10, and having a fixed fence 12 rising from one edge thereof, which for convenience will be denoted its forward edge. Said fence is operable to guide work pieces moved over the top surface of slab 4 relative to a circular saw blade 14. Table top slab 4 is divided from front to back, and an insert 16 flush with the top surface of the rest of the slab is longitudinally slidable in the division. Blade 14 is driven by an electric motor 18 mounted on the lower surface of the insert. Thus the blade may be adjusted laterally of itself relative to fence 12, whereby to position the saw cut relative to an edge of a work piece guided by the fence. Insert 16 may be yieldably fixed in position at any point of its longitudinal movement by any suitable means, not shown. Fence 12 is used, however, only when the work piece is of a size which may be conveniently and accurately guided on slab 4, and since this slab on many table saws is only about two feet long, this limits usage to comparatively small work pieces. Whenever the length of the work piece, transversely to the saw plane, exceeds the table length to any great extent, a table extension such as shown herein, and forming the subject matter of the present invention may be used.

The extension table assembly forming the subject matter of the present invention comprises, in general, a top slab assembly 22, and a wheeled carriage assembly 24 supporting said top slab assembly. Top slab assembly 22 includes a pair of parallel spaced apart stringer members 26 extending longitudinally of the extension table, and a plurality of flat slabs 28 mounted on and secured to said stringers as by rivets 30. Slabs 28, (three shown), extend laterally of the stringers and project laterally outwardly therefrom, and are spaced apart longitudinally of the stringers. Disposed between each successive pair of slabs is a much narrower fence member 32, also extending laterally of the stringers. Another fence member 32 is disposed behind the rearmost slab 28. At the rearmost end of each stringer, a support bar 34 is welded to the lower surface of the stringer, and projects rearwardly from the rearward end of the stringer. An extension stringer 36 is pivoted to the extreme rearward end of each support bar 34 on a horizontal transverse axis, as at 38, said extension stringer being of such length, when horizontal, to mate with the rearward end of its associated stringer 26, and to extend well to the rear of pivot 38. The rearmost extension slab 28 is divided transversely so that its forward portion rests on and is secured to stringers 26, and its rearward portion rests on and is secured to stringer extensions 36. Carried for longitudinal sliding movement in each of the stringer extensions 36 is a bar 40, the rearwardly extending ends of both of said bars being rigidly interconnected by a transversely extending channel 42, said channel opening forwardly. Stringer extensions 36, and the elements mounted thereon, comprise a loader assembly designated generally by the numeral 44 in FIGS. 1-6. As shown in FIGS. 1 and 2, the loader assembly may be disposed horizontally, in which position it may be secured by a pair of latches 46 (one shown) each pivoted as at 48 to one of the stringer extensions and being engageable by gravity with a pin 50 fixed to the associated support bar 34. That is, as shown in FIG. 5, as the loader is swung toward its horizontal position, pin 50 engages and pivots latch 46, but when the loader reaches horizontal, the latch swings back to engage the pin. Latches 46 must be released manually. The loader pivots to a vertical position, as shown in FIGS. 3 and 6, whenever latches 46 are released. Bars 40 and channel 42 are then extended by gravity, as shown in FIG. 3, until channel 42 is closely adjacent floor level 10, the degree of extension being limited by a pin 52 fixed in each stringer extension 36, which projects through a closed-end slot 54 formed through the associated bar 40. When bars 40 and channel 42 are fully retracted upwardly, they may be secured against extension by spring latches 56, each attached to the lower end of the associated extension 36 and operable to spring beneath the lower end of the associated bar 40 to secure it against downward movement, as shown in FIG. 6.

Each fence member 32 is connected to the slab member 28 disposed forwardly thereof, for pivotal movement on a horizontal transverse axis, by a pair of hinges 58, best shown in FIGS. 11-13. Each hinge 58 includes a leaf 60 having a flange 62 secured flat against the lower surface of slab 28 by fasteners 64, and a flange 66 downwardly at right angles to flange 62, and a second leaf 68 having a flange 70 affixed to the lower surface of fence member 32 by fasteners 72 and a flange 74 extending downwardly at right angles to flange 70. Flanges 66 and 74 are pivotally joined by a horizontal, transverse pivot pin 76 which is transversely movable in a slot 78 formed vertically in flange 66. It will be seen in FIG. 12 that the fence member 32 may be pivoted rearwardly and downwardly to lie in the same plane as table extension slabs 28, to form additional portions of the work-supporting surface provided thereby. In this position, the fence member is supported by stringers 26. As shown in FIG. 11, the fence member may be raised to a use position rising directly from the rearward edge of its associated slab 28. During this movement, the fence member is raised bodily as well as being pivoted, as permitted by rising movement of hinge pin 76 in slot 78, but when the fence member is pivoted to a fully vertical position, flange 70 of hinge leaf 68 drops into a closely fitting notch 80 formed in flange 66 of hinge leaf 58, thereby locking the fence member in its raised position. It may be manually returned to the FIG. 12 position by lifting the fence member bodily to release the described locking action.

Top slab assembly 22 is releasably attached at its forward end to basic table saw 2 by means of releasable fasteners 82 disposed at the forward end of each stringer 26 of the top slab assembly 22, as shown in FIGS. 1, 2 and 6, and as shown in greater detail in FIGS. 18 and 19. Each of said fasteners comprises a vertical, transversely disposed plate 84 affixed to the rearward end of its associated stringer 26, and a matching plate 86 affixed to the frame 6 of the basic table saw, below the top slab 4 thereof. Plates 84 and 86 lie in face-to-face contact when the extension assembly is operably attached to the basic table saw. A screw 88 extends horizontally forwardly and rearwardly rearwardly of plate 84, being threaded in a bracket 90 affixed to said plate. Said screw is provided with a reduced forward extension stem 92 which is journalled rotatably in plate 84, and is provided forwardly of said plate with an enlarged head 94. When said head is advanced slightly forwardly by turning screw 88, and the extension assembly elevated slightly relative to the table saw, said head may be inserted forwardly and freely through a hole 96 provided therefor in plate 86. When the extension assembly is then lowered, screw stem 92 drops snugly into a narrowed downward slot 98 of hole 96, through which enlarged head 94 cannot be withdrawn. Therefore, when screw 88 is moved rearwardly by turning it in bracket 90, the plates 84 and 86 are drawn tightly together with a connection which is tight, and "wobble-free". In this manner, the connection insures that the fences 32 of the extension assembly are always held in accurately parallel relation to the plane of saw blade 14, for more accurate work. The fasteners 82 are of course so placed that when fully engaged, the top surfaces of top slabs 4 of the table saw and slabs 28 of the extension assembly are precisely coplanar.

Wheeled carriage assembly 24 includes a pair of heavy skid members 100 each affixed at its upper end to one of stringers 26 adjacent the forward end of the extension assembly, then extending downwardly as indicated at 102, then inclined downwardly and rearwardly as indicated at 104, and finally extended horizontally rearwardly as indicated at 106. To the rearward end of each skid, the forward end of a rearwardly and downwardly extending strut 108 is pivoted, as at 110. Each of said struts comprises an upper section 112 and a lower section 114, pivoted together at their contiguous ends on a horizontal transverse axis, as at 116. As illustrated in FIG. 10, this pivotal connection is so arranged that it may buckle freely upwardly, but is locked against downward buckling. The lower rearward end of each lower strut section 114 is affixed to a generally triangular metal plate 118 which is disposed vertically, and the plates 118 at the opposite sides of the assembly are rigidly interconnected by a transverse bar 120. Each plate 118 also carries a floor engaging wheel 122 disposed outwardly thereof, said wheel being rotatably mounted on said plate at 124. Each plate is also supported vertically by a rear assembly leg 126. Each of legs 126 comprises an upper section 128 and a lower section 130, pivoted together on a horizontal axis at their contiguous ends by a pin 132. The upper end of upper leg section 128 is pivoted to a support bar 34 of the top slab assembly as at 134, and the lower end of the lower leg section is pivoted to the cross bar extending between plates 118, as at 136. As shown in FIG. 14, the pivot pin 132 of each of legs 126 extends through slot 138 of lower leg section 130, but is fixed in upper leg section, in such a manner that when the pin is moved to the lower end of the slot by the weight of the top slab assembly imposed on said leg, the leg cannot buckle either forwardly or rearwardly. This is the position shown in solid lines in FIG. 14. However, when the rearward end of the top slab assembly is lifted manually from the floor to remove weight from the leg, the lower leg section drops by gravity to move slot 138 downwardly over the pin, as shown in dotted lines in FIG. 14. In this position, as illustrated, each of legs 126 can buckle forwardly, but remains locked against rearward buckling.

The carriage assembly also includes a front wheel 140 carried rotatably by a small horizontal plate 142 disposed beneath the forward end portion of top slab assembly 22. A front leg 144 is affixed at its lower end to said plate, and is affixed at its upper end to a horizontal, transversely extending bar 146 disposed in spaced relation below the top slab assembly, but above the level of the rear horizontal portions of skids 100. Bar 146 is mounted for pivotal movement about its own axis between the lower ends of a pair of depending posts 148, the pivotal connections at each end of said bar being indicated at 150. Stop members 152 affixed to said bar (see FIGS. 15-17) engage posts 148 to limit the forward pivoting movement of leg 144 to the position shown in FIG. 2, but permit free rearward movement of said leg. An upwardly extending lever 154 is pivoted at its lower end on a horizontal, transverse pin 156 extending between and mounted in a pair of ears 158 (see FIG. 15) affixed to the top side of bar 146 adjacent the midpoint of said bar. Said lever is configured to form an upwardly opening hook 160 at its rearward side. A coil spring 162 carried on pin 156 biases said lever rearwardly to the position shown in FIGS. 2 and 16, where its rearward movement is arrested by the engagement of a stop finger 164 formed therewith against the rearward side of bar 146, but the lever may be pivoted forwardly manually. The small horizontal plate 142 carrying front wheel 140 has a small vertical plate 166 affixed thereto, having an upwardly opening notch 168. A generally horizontal strut 170 extends forwardly and rearwardly just above floor level. Said strut comprises a pair of transversely spaced apart bars 172 the rearward ends of which are pivoted respectively to the rear legs 126 in spaced relation above the lower pivots 136 of said legs, as at 174. Said bars converge forwardly, and have their closely spaced apart forward ends rigidly interconnected by a transverse pin 176. Normally, pin 176 is engaged in notch 168 of the plate 166 at the lower end of front leg 144.

Normally, in use, the extension table assembly is positioned as shown in FIGS. 1 and 2, with rear legs 126 locked in position by the triangulation of said legs, struts 108, skids 100, and top slab assembly 22, and rear leg 144 locked in its forward position with stops 152 engaging posts 148, by means of strut 170. This places the top slab assembly in coplanar relation to the top slab 4 of the basic table saw, to which the extension assembly is joined by fasteners 82, thereby providing a greatly extended work supporting surface for supporting large work pieces as they are moved in relation to saw blade 14. During this movement, the work piece is guided in a straight line movement by its sliding engagement with the one of fences 32 best adapted to the length of the work piece transversely to the vertical plane of the blade. Normally, only that one of said fences is moved to the operative position shown in FIG. 11, while the other fences are lowered to their inoperative positions as shown in FIG. 12 to comprise additional elements of the work supporting surface. By way of example only, the fences may be disposed at incrementally increasing distances from the rearward edge of table saw top slab 4 of about two feet, thus enabling the table saw with the extension assembly connected to accomodate work pieces up to perhaps eight feet long.

Such large work pieces may be quite heavy and cumbersome, and correspondingly difficult for an operator to lift and arrange on the table, especially if he must work with no assistance. Loader assembly 44 is provided to assist in these circumstances. It is readied for use by first placing all of fences 32 in their inoperative positions, manually releasing the latches 46 securing the loader assembly in horizontal position, pivoting the loader assembly to a vertical position as shown in FIGS. 3 and 6, and manually releasing spring latches 56 to allow bars 40 and channel 42 to be extended downwardly by gravity, as shown in FIG. 3. Channel 42 is then closely adjacent the floor 10, and the lower edge of a work piece 178, indicated in dotted lines in FIG. 3, may then be rested in said channel. If the work piece is quite heavy, and by way of example a four-by-eight foot sheet of three-quarter inch thick plywood weights about seventy-five pounds, it may be lifted and moved about much more easily in a vertical position, as shown, than in any other position. The work piece, and the loader assembly, may then be tilted forwardly until horizontal, the work piece coming to rest on the extension table, and the loader assembly then being locked in its horizontal position by automatic reengagement of latches 46 with pins 50. Channel 42 may then be pressed forwardly, of course after the work piece has been moved forwardly, until spring latches 56 automatically reengage.

The extension table assembly, when disconnected from the table saw 2 as shown in FIG. 6, may also be more conveniently transported in the bed of an ordinary pick-up truck by collapsing the wheeled carriage assembly upwardly against the bottom of top slab assembly 22. Furthermore, this may be accomplished very simply and easily by a single person, in a manner at least semi-automatic. FIG. 2 shows the extension table assembly moved forwardly so that the inclined portions 104 of skids 100 engage the rearward edge of the bed 180 of a pick-up truck, assuming of course that the extension assembly has been disconnected from table saw 2 at fasteners 82, and is still supported by wheeled carriage 24. At this time, the operator lifts pin 176 of strut 170 free of notch 168, and pivots said strut upwardly until said pin engages the curved outer surface of hook 160 of lever 154, as shown in FIG. 16. Further upward movement of the strut causes the pin to cam said lever forwardly, as shown in FIG. 17, against the yieldable bias of spring 162, until the pin passes above the hook. The hook is then returned rearwardly by the spring, and the strut may then be released to lower the pin into the hook.

The operator then pushes the entire assembly forwardly, which causes the inclines 104 of skids 100 to ride up the rearward edge of truck bed 180, whereby to lift the forward end of the extension assembly, and simultaneously manually lifts the rearward end of the assembly. The weight of the assembly is such that this may be done easily. The forward movement of the assembly then causes the truck bed to engage front wheel leg 144, below its pivot 150, and causes said leg, now freed from the restraint of strut 170, to pivot forwardly as shown in FIG. 6. Pin 176 of said strut, being above pivot 150, is thus pulled forwardly by hook 160, causing said strut to pull forwardly on lower sections 130 of rear legs 126, causing said rear legs to start buckling forwardly at their pivots 132 which have been unlocked, as described, by lifting wheels 122 from the floor. At about the same time, the rearward edge of the truck bed engages the downwardly and rearwardly inclined upper sections 112 of struts 108, pivoting said sections upwardly and causing said struts to begin buckling upwardly at their pivots 116. Further forward movement of the assembly over the truck bed lifts front leg 144 to a horizontal position, and when the truck bed edge engages the lower sections 114 of struts 108, said struts are again straightened and rear legs 126 are jackknifed upwardly to raise rear wheels 122. Eventually, all of the wheels, and their supporting legs and struts, will be disposed within the vertical height between the top slab assembly 22 and the lower horizontal reaches 106 of struts 100. During this final movement, pin 176 of strut 170 moves forwardly out of engagement with hook 160 of lever 154, simply riding freely along a straight portion of the lever. By way of example only, the wheeled carriage 24 may support top slab assembly 22 at 38 inches above the floor level to be coplanar with the table saw, the truck bed floor 180 may be about 27 inches above ground level, and skids 100 may project to about 23 inches above the floor. This allows about 15 vertical inches in which to collapse the carriage assembly, and this is ample. The extension assembly may be removed from the truck bed and extended again to its use position by reversing the procedure described above. The loader assembly 44 may be moved to its vertical position as previously described, and as shown in FIG. 6. This shortens the total length of the assembly to some degree, and may permit said assembly to be stored and transported as described in shorter truck beds.

The assembly may be removed from the truck by pulling it rearwardly along the truck bed almost to the position shown in FIG. 2, whereupon the wheels, legs and struts will return to their normal positions by gravity, except of course that pin 176 of strut 170 will still be engaged in hook 160 of lever 154. The operator frees this pin by lifting it from the hook, pivoting said lever forwardly against spring 162, and lowering the pin past the hook. The pin is then reengaged in notch 168, and the assembly is complete.

While I have shown and described a specific embodiment of my invention, it will be readily apparent that many minor changes of structure and operation may be made without departing from the spirit of the invention.

What I claim as new and desire to protect by Letters Patent is:

1. An extension table assembly for a table saw, said table saw having a table top through which a saw blade operates in a vertical plane, and the blade is adjustably movable transversely to its plane relative to said table top, said table extension assembly comprising:
    a. an elongated top slab assembly,
    b. a floor-engaging sub-structure supporting said top slab assembly so that the latter is coplanar with the table top of said table saw,
    c. connector means operable to join one end of said top slab assembly releasably to an edge of the table top of the table saw parallel to the plane of the saw blade, and
    d. a series of fence members carried by said top slab assembly and extending transversely thereof, said fence members being disposed at successively greater distances from the end of the top slab assembly connectable to said table saw, and each of said fence members being connected to said top slab assembly for movement between an operative position projecting upwardly from the top surface of the top slab assembly and an inoperative position not projecting above said top surface.

2. An extension table assembly as recited in claim 1 wherein each of said fence members is connected to the top slab assembly by hinges providing for movement of said fence member between an operative position projecting upwardly from the top surface of the top slab assembly to an inoperative position lying directly in the plane of said top slab assembly, each of said hinges including automatically engageable, manually releasably means for locking the associated fence member in said operative position.

3. An extension table assembly as recited in claim 1 wherein said connector means for joining said extension assembly to said table saw includes means whereby said connection may be made tight and free of any looseness or "wobble", in order that the fence members carried by said top slab assembly will be held reliably in precisely parallel relation to the plane of the table saw blade.

4. An extension table assembly as recited in claim 2 wherein said connector means for joining said extension assembly to said table saw comprises:
   a. a pair of vertical plates disposed in planes transverse to said top slab assembly and affixed respectively to said slab assembly and said table saw, so as to be disposed in face-to-face overlying relation when said top slab assembly is connected to said table saw,
   b. an elongated stem member carried by one of said plates for movement transversely to the planes thereof, and including a reduced neck journalled in the associated plate and having an enlarged head at its extended end, said head being adapted to be inserted freely through an enlarged hole formed through the other of said plates and then moved transversely to engage said neck in a reduced extension of said hole through which said head cannot pass, and
   c. a screw means operable to pull said head against said other plate to draw said plates into tightly engaged relation.

5. An extension table assembly for a table saw, said table saw having a table top through which a saw blade operates in a vertical plane, and the blade is adjustably movable transversely to its plane relative to said table top, said table extension assembly comprising:
   a. an elongated top slab assembly,
   b. a floor-engaging sub-structure supporting said top slab assembly so that the latter is coplanar with the table top of said table saw, and
   c. connector means operable to join one end of said top slab assembly releasably to an edge of the table top of the table saw parallel to the plane of the saw blade, the end portion of said top slab assembly opposite to the end thereof connectable to said table saw being pivoted to the remainder of the assembly on a horizontal transverse axis spaced apart from the extreme end of the top slab assembly to form a loader section, said loader section being pivotal to a vertical position to shorten the total length of the top assembly for better storage proportions, and to receive a flat work piece disposed in a vertical plane, whereby said work piece may be tilted to lie on the remainder of the table extension by tilting said loader section back to a horizontal position.

6. An extension table assembly as recited in claim 5 with the addition of manually operable latch means for securing said loading section releasably in its horizontal position.

7. An extension table assembly as recited in claim 5 with the addition of a transversely extending channel member disposed at the outer end of said loader section and opening toward the pivotal connection thereof to the remainder of said top slab assembly, whereby to open upwardly when said loader section is pivoted to its vertical position, in order better to receive and support the lower edge of a vertically disposed work piece.

8. An extension table assembly as recited in claim 7 wherein said channel is mounted in said loader section by mean permitting it to be slidably extended outwardly from said loader section, in the plane thereof, whereby said channel may be disposed closely adjacent the floor on which said sub-structure is supported, when said loader section is pivoted to its vertical position.

9. An extension table assembly as recited in claim 8 with the addition of manually operable latch operable to secure said channel releasably in its non-extended position relative to said loader section.

10. An extension table assembly for a table saw, said table saw having a table top through which a saw blade operates in a vertical plane, and the blade is adjustably movable transversely to its plane relative to said table top, said table extension assembly comprising:
   a. an elongated top slab assembly,
   b. a floor-engaging sub-structure supporting said top slab assembly so that the latter is coplanar with the table top of said table saw, said sub-structure constituting a wheeled carriage, whereby said assembly, when disconnected from said table saw, constitutes a wheeled cart which may be used for conveniently transporting many different materials, and
   c. connector means operable to join one end of said top slab assembly releasably to an edge of the table top of the table saw parallel to the plane of the saw blade.

11. An extension table assembly as recited in claim 10 wherein said wheeled carriage is foldably collapsible upwardly against the lower surface of said top slab assembly, whereby the entire extension assembly may be completely contained in a space which is vertically much less than the height of the assembly when extended.

12. An extension table assembly as recited in claim 10 wherein said wheeled carriage comprises:
   a. floor-engaging wheels,
   b. legs connected to and depending from said top slab assembly and carrying said wheels at their lower ends, said legs being pivotally foldable upwardly against the lower side of said top slab assembly, and
   c. means operable by the rearward edge of a truck bed, said truck bed being disposed lower than the normal elevation of said top slab assembly but higher than the normal elevation of said wheels, to fold said legs upwardly to elevate said wheels, as said extension assembly is pushed forwardly over said truck bed.

13. An extension table assembly as recited in claim 12 wherein said wheeled carriage additionally includes a system of struts normally securing said legs against said folding movement, one of said struts being manually engageable and disengageable to lock said legs positively against said folding movement, whereby said means operable by the rearward edge of a truck bed to fold said legs is rendered inoperable except when said one strut has been manually disengaged.

* * * * *